(12) United States Patent
Aikawa et al.

(10) Patent No.: US 8,783,434 B2
(45) Date of Patent: Jul. 22, 2014

(54) VEHICLE TRANSMISSION WITH BUILT-IN BRAKE

(75) Inventors: Fujito Aikawa, Kanagawa (JP); Akihiko Fujimoto, Kanagawa (JP)

(73) Assignees: Mitsubishi Nichiyu Forklift Co., Ltd., Kyoto (JP); Okamura Corporation, Kanagawa (JP)

( * ) Notice: Subject to any disclaimer, the term of this patent is extended or adjusted under 35 U.S.C. 154(b) by 0 days.

(21) Appl. No.: 13/580,839

(22) PCT Filed: Oct. 25, 2010

(86) PCT No.: PCT/JP2010/068813
§ 371 (c)(1),
(2), (4) Date: Aug. 23, 2012

(87) PCT Pub. No.: WO2011/104930
PCT Pub. Date: Sep. 1, 2011

(65) Prior Publication Data
US 2012/0318631 A1  Dec. 20, 2012

(30) Foreign Application Priority Data

Feb. 25, 2010  (JP) .................................. 2010-040085

(51) Int. Cl.
*F16D 55/40* (2006.01)
*B60T 1/06* (2006.01)

(52) U.S. Cl.
USPC .................... 192/221.1; 192/219.7; 188/72.9; 188/71.5

(58) Field of Classification Search
USPC ........... 192/221, 219.6, 219.7, 225; 188/72.9, 188/71.6, 72.6
See application file for complete search history.

(56) References Cited

U.S. PATENT DOCUMENTS

| | | | | |
|---|---|---|---|---|
| 2,263,505 A | * | 11/1941 | Lambert | 188/72.2 |
| 2,981,376 A | * | 4/1961 | Zeidler | 188/71.5 |
| 3,332,518 A | | 7/1967 | North et al. | |
| 3,647,031 A | * | 3/1972 | Burnett | 188/72.6 |
| 5,147,255 A | | 9/1992 | Strehler et al. | |
| 5,174,419 A | | 12/1992 | Strehler et al. | |
| 2009/0277727 A1 | * | 11/2009 | Ueno | 188/71.5 |

FOREIGN PATENT DOCUMENTS

| | | |
|---|---|---|
| CN | 101427045 A | 5/2009 |
| JP | 50-10984 U | 2/1975 |
| JP | 02-173470 A | 7/1990 |

OTHER PUBLICATIONS

International Search Report issued in International Patent Application No. PCT/JP2010/068813 dated Dec. 7, 2010.
Extended European Search Report issued in European Application No. 10846593.1 dated Sep. 2, 2013, 5 pages.
Chinese Office Action issued in Chinese Application No. 201080064440.3 with Date mailed Mar. 5, 2014.

* cited by examiner

*Primary Examiner* — Rodney Bonck
*Assistant Examiner* — Lillian Nguyen
(74) *Attorney, Agent, or Firm* — McDermott Will & Emery LLP

(57) ABSTRACT

A hydraulic piston is housed in a cylinder chamber that is provided in a cover plate of a transmission case and that opens toward a pressing arm so that the hydraulic piston is capable of rotating the pressing arm by abutting against a rearward arm portion of the pressing arm, and a hydraulic pipe supplying pressure oil to the cylinder chamber is connected to the cover plate.

5 Claims, 4 Drawing Sheets

VEHICLE TRANSMISSION WITH BUILT-IN BRAKE

RELATED APPLICATIONS

This application is the U.S. National Phase under 35 U.S.C. §371 of International Application No. PCT/JP2010/068813, filed on Oct. 25, 2010, which in turn claims the benefit of Japanese Application No. 2010-040085, filed on Feb. 25, 2010, the disclosures of which Applications are incorporated by reference herein.

FIELD

The present invention relates to a transmission with a built-in brake arranged between an electric drive unit and a wheel in, for example, a vehicle such as an electric forklift truck.

BACKGROUND

An example of a transmission with a built-in brake of this type is disclosed, for example, in Patent Literature 1, and includes a drive gear driven by an electric motor, a planetary gear unit connected to the drive gear, and a disc brake unit provided between the drive gear and the planetary gear unit, wherein a driving force transmitted from the drive gear to the planetary gear unit is braked by pressing side surfaces of brake discs of the disc brake unit with a pressure plate.

CITATION LIST

Patent Literature

Patent Literature 1: U.S. Pat. No. 5,147,255

SUMMARY

Technical Problem

In the transmission with a built-in brake described in Patent Literature 1 mentioned above, as illustrated in FIG. 7 of Patent Literature 1, the pressure plate is pressed by a dual system including a cable connected to and pulled by a parking brake operating lever and a hydraulic piston operated by pressure oil when a brake pedal is depressed. In the transmission, an end of the cable, the hydraulic piston, and a hydraulic pipe for operating the piston with the pressure oil are mounted together on a pressing arm for pressing the pressure plate. Therefore, the hydraulic pipe frequently moves together with the pressing arm each time braking is applied via the brake pedal.

As a result, bending load is repeated applied to a connecting portion and a supporting portion of the hydraulic pipe. When a vehicle is used for a long period of time, the pressure oil could leak out due to, for example, occurrence of a crack in the hydraulic pipe.

For the foregoing reasons, there is a need for a vehicle transmission incorporating a built-in brake and including a hydraulic piston and a hydraulic pipe supplying pressure oil thereto in a stationary member, so that occurrence of, for example, a crack in the hydraulic pipe can be prevented.

Solution to Problem

The present invention is directed to a chair that satisfies the need by the following aspects:

(1) A vehicle transmission with a built-in brake, the vehicle transmission pressing a pressure plate in a disc brake unit housed in a transmission case by pressing an outer end of a pressing rod penetrating a sidewall of the transmission case with one end of a pressing arm that is pivotally provided in a rotatable manner on the sidewall and that is rotated by a dual system including a parking brake cable and a hydraulic piston operated by operation of a brake pedal, wherein the hydraulic piston is housed in a cylinder chamber that is open toward the pressing arm provided on the sidewall so as to be capable of abutting against the other end of the pressing arm and rotating the pressing arm, and a hydraulic pipe that supplies pressure oil to the cylinder chamber is connected to the sidewall.

With the configuration as described above, the hydraulic piston that rotates the pressing arm with the pressure oil when the brake pedal is operated is housed in the cylinder chamber on the sidewall of the transmission case, and the hydraulic pipe that supplies the pressure oil to the cylinder chamber is connected to the stationary sidewall. Therefore, the hydraulic pipe is prevented from frequently moving together with the pressing arm each time braking is applied via the brake pedal, as conventionally occurs. Accordingly, the pressure oil is free from any possibility of leaking out due to, for example, occurrence of a crack in the hydraulic pipe, and durability of the hydraulic pipe can be improved.

(2) The vehicle transmission with a built-in brake according to (1), wherein a pin is interposed between the pressing arm and the hydraulic piston so as to be movable in a tilting manner relative to the hydraulic piston.

With the configuration as described above, the pin tilts relative to the hydraulic piston when the pin rotates the pressing arm. Therefore, the hydraulic piston and the pin are not subjected to any bending load, and the pressing arm can also rotate without resistance.

(3) The vehicle transmission with a built-in brake according to (2), wherein a conical depressed portion is provided at an end face of the hydraulic piston facing the pressing arm, and the pin having a spherical end face on the hydraulic piston side is abutted so as to be movable in a tilting manner against a bottom surface of the depressed portion.

With the configuration as described above, the pin can tilt in a stable manner about the center thereof at the depressed portion of the hydraulic piston.

(4) The vehicle transmission with a built-in brake according to (1), wherein a pin having a spherical end face on the pressing arm side is integrally provided in a protruding manner on an outer face of the hydraulic piston, and the spherical end face is abutted against the other end of the pressing arm.

With the configuration as described above, the pin need not be produced separately, and no member for holding the pin is required. Therefore, the number of components, the number of assembly man-hours, and cost are reduced.

Advantageous Effects of Invention

According to the aspects of the present invention, a hydraulic pipe is prevented from frequently moving together with a pressing arm each time braking is applied via a brake pedal. Accordingly, pressure oil is free from any possibility of leaking out due to, for example, occurrence of a crack in the hydraulic pipe, and durability of the hydraulic pipe can be improved.

DESCRIPTION OF EMBODIMENTS

An embodiment of the present invention will be described below based on the accompanying drawings.

Figure 1:
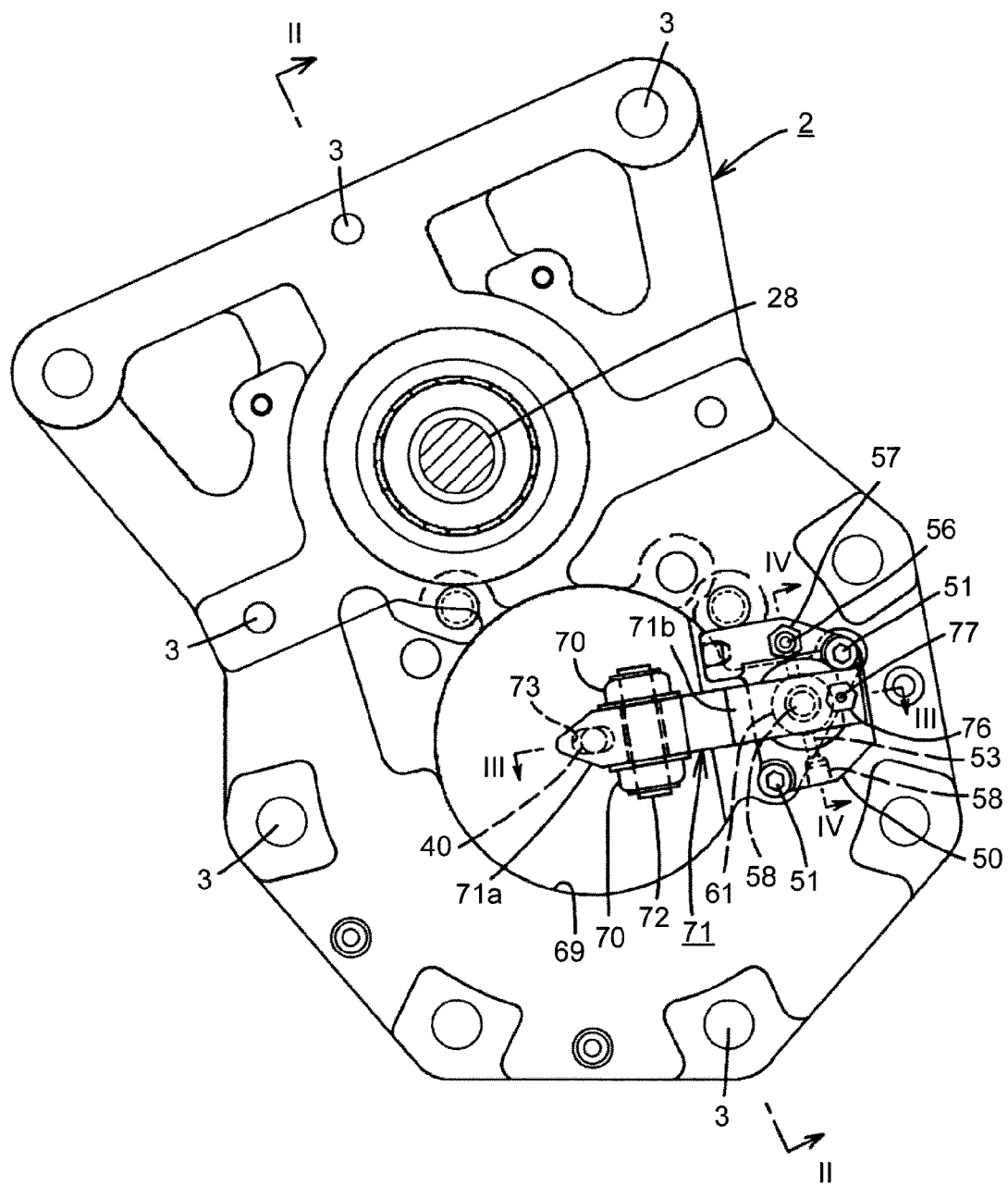
FIG. 1 is a side view of a transmission with a built-in brake of the present invention.
Figure 2:
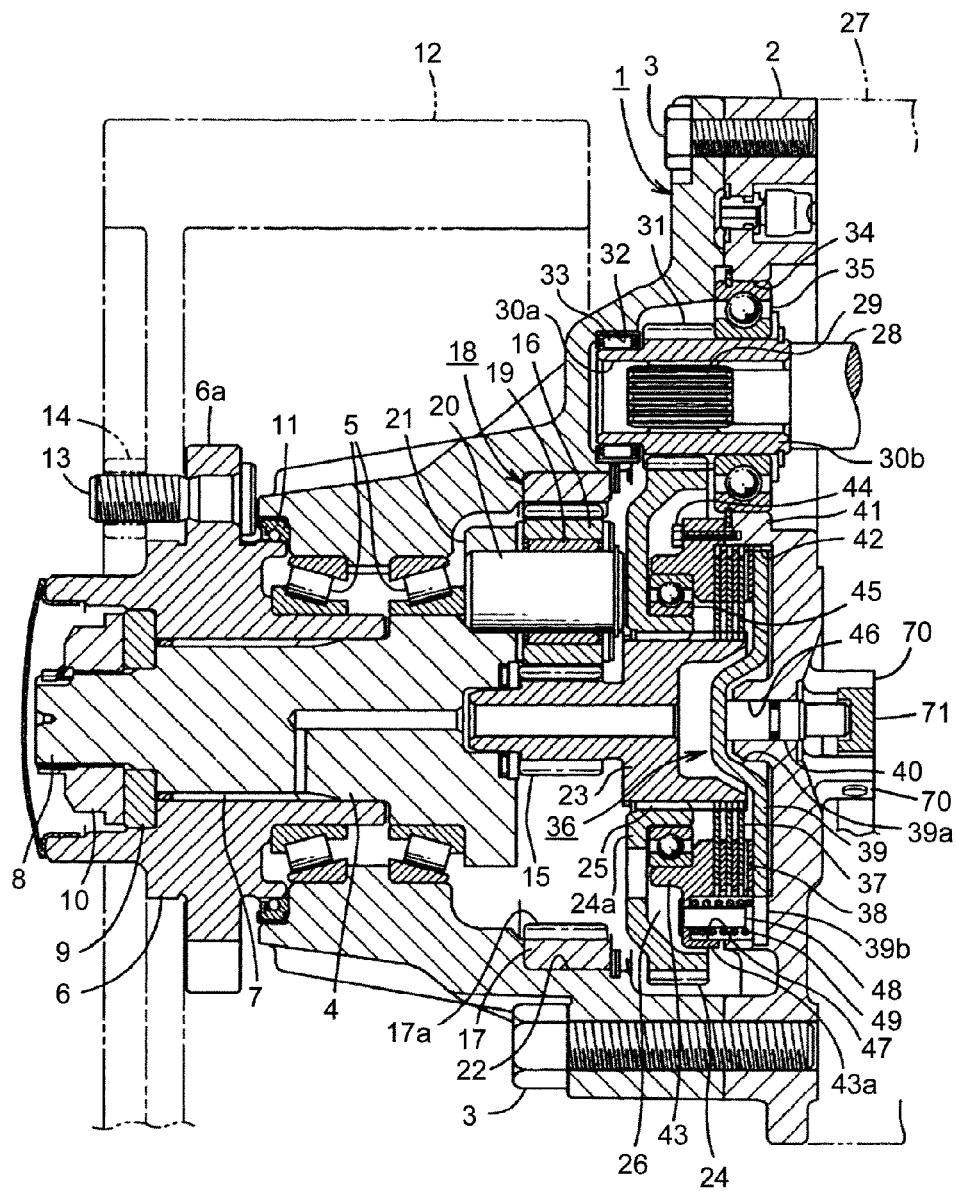
FIG. 2 is an enlarged longitudinal sectional front view taken along the line II-II of FIG. 1.

FIG. 1 is a side view of a transmission with a built-in brake of the present invention that drives a wheel of, for example, an electric forklift truck, as viewed from inside of a vehicle body, and FIG. 2 is an enlarged longitudinal sectional front view taken along the line II-II of FIG. 1. Note that, in the description below, the terms "right" and "left" will be used with reference to FIG. 2.

In FIG. 2, a cover plate 2 serving as a sidewall of a transmission case 1 is fixed by a plurality of bolts 3 on an aperture surface of the right side face of the transmission case 1, and in a left half portion in the transmission case 1, an output shaft 4 is rotatably supported by a bearing 5 with the left end thereof protruding leftward of the transmission case 1.

A wheel shaft 6 is fitted onto the outside of the left end of the output shaft 4 in a relatively unrotatable manner with a spline 7 interposed therebetween, and integrally connected to the output shaft 4 by a nut 10 that is threadably mounted with a washer 9 interposed therebetween on a small-diameter screw shaft 8 at the left end of the output shaft 4.

An outer peripheral surface at the right end of the wheel shaft 6 is rotatably supported by the bearing 5 on an inner surface of the left end of the transmission case 1. Reference numeral 11 represents a seal member that is press-fitted in an inner peripheral surface of the left end of the transmission case 1. The seal member 11 is in sliding contact with an outer peripheral surface of the wheel shaft 6, and thereby prevents lubricant oil supplied to the transmission case 1 from leaking outside.

A wheel 12 is fixed to an expanded diameter flange 6a of the wheel shaft 6 by a plurality of bolts 13 and nuts 14.

The transmission case 1 houses, in a central portion thereof, a planetary gear unit 18 composed of a sun gear 15 in the center, a plurality of (for example, three) planetary gears 16 meshing with the sun gear 15, and a ring gear 17 having, on an inner peripheral surface thereof, internal teeth 17a meshing with the planetary gears 16 in a manner surrounding them.

A spindle 20 directed in the right-left direction is rotatably fitted in the center of each of the planetary gears 16 with a bearing 19 interposed therebetween. The left-side protruding end of the spindle 20 is press-fitted in each connecting piece 21 provided in a protruding manner on an outer peripheral surface at the right end of the output shaft 4.

The ring gear 17 is press-fitted and fixed into a stepped hole 22 on an inner surface of the transmission case 1. With this arrangement, when the sun gear 15 rotates, the planetary gears 16 revolve along the internal teeth 17a of the ring gear 17 while rotating on their own axes, and thus, the output shaft 4 rotates at a decelerated speed.

The right end of the sun gear 15 is provided with a large diameter drive shaft 23 driving the sun gear 15 in a concentrically integrally connected manner to the sun gear 15.

A cylindrical axis 24a in the center of a drive gear 24 is fitted onto an outer peripheral surface of the drive shaft 23 in a relatively unrotatable manner with a mutually engaging spline 25 interposed therebetween.

The drive gear 24 is formed, on the right side face thereof facing the cover plate 2, with an annular depressed portion 26 opening toward the cover plate 2, and thus, has a roughly C-shaped section in the front view having a small dimension in the axial direction.

An input shaft 28 is coupled with and driven by an electric drive unit 27 on the vehicle body side on which the transmission case 1 is mounted, and the left end of the input shaft 28 penetrates the cover plate 2 and protrudes into a right-side end in an upper portion of the transmission case 1. A tubular input gear 31 that has, at both right and left ends thereof, cylindrical support shafts 30a and 30b directed in the axial direction thereof is fitted in a relatively unrotatable manner onto the outside of a spline 29 that is formed on an outer peripheral surface of the left end of the input shaft 28. The input gear 31 meshes with the drive gear 24.

An outer peripheral surface of the support shaft 30a on the left side of the input gear 31 is rotatably supported by a bearing 33 press-fitted in a stepped hole 32 of the transmission case 1. In the same manner, an outer peripheral surface of the support shaft 30b on the right side is rotatably supported by a bearing 35 press-fitted in a through-insertion hole 34 of the support shaft 30b in the cover plate 2. With this arrangement, the input gear 31 is supported in a stable manner substantially at both ends by the transmission case 1 and the cover plate 2.

A multi-plate disc brake unit 36 is embedded in a space formed between the depressed portion 26 of the drive gear 24 and the left side face of the cover plate 2 facing the depressed portion 26, as follows.

The disc brake unit 36 is provided with a plurality of rotating-side brake discs 37, a plurality of fixed-side brake discs 38 that are alternately interposed so as to be superimposed in the axial direction between the mutually adjacent rotating-side brake discs 37, a circular disc-like pressure plate 39 that can move to press in the axial direction the right side face of the fixed-side brake disc 38 located at the rightmost side, and a pressing rod 40 that is coupled with a pressing arm 71 (to be described later) while being capable of pressing a central portion of the pressure plate 39 toward the left side.

A corrugated portion (omitted from illustration) formed on a circular hole in the center of each of the rotating-side brake discs 37 is fitted in a relatively unrotatable manner and in a movable manner in the axial direction onto the outside of the spline 25 on the outer peripheral surface of the drive shaft 23 protruding toward the right side of the drive gear 24, so that the corrugated portion integrally rotates with the drive shaft 23.

A corrugated portion (omitted from illustration) on an outer periphery of each of the fixed-side brake discs 38 is fitted in a movable manner in the axial direction and in an unrotatable manner into a spline 42 formed on an inner peripheral surface in a cylindrical portion 41 that is provided on the left side face of the cover plate 2 in an inward protruding manner so as to surround the right-side end of the drive shaft 23.

Reference numeral 43 represents a disc holding plate that prevents the rotating-side brake discs 37 and the fixed-side brake discs 38 from moving toward the left side, and is firmly fixed by a plurality of bolts 44 onto an inner end face of the cylindrical portion 41 on the cover plate 2 while being capable of abutting against an inner face of the innermost rotating-side brake disc 37 and allowing a part of an inner portion thereof to be housed in the depressed portion 26 of the drive gear 24.

An inner end of the disc holding plate 43 is supported by the cylindrical axis 24*a* of the drive gear 24 with a bearing 45 interposed between an inner peripheral surface of the inner end and an outer peripheral surface of the cylindrical axis 24*a* of the drive gear 24 so as not to cause hindrance in rotation of the drive gear 24.

The pressing rod 40 is fitted in a slidable manner in the axial direction in an axial hole 46 formed in the cover plate 2 in the right-left direction, and the left end of the pressing rod 40 abuts against the bottom surface center on the right side face in a circular swollen portion 39*a* that is formed in the central portion of the pressure plate 39 and that is swollen toward the drive gear 23.

A plurality of (for example, three) protruding portions 43*a* are integrally provided in a protruding manner at even intervals in the circumferential direction on an outer peripheral surface of the disc holding plate 43, and have depressed holes 47 opening in the direction toward the cover plate 2. A guide pin 48 is pressed into each of the depressed holes 47 from the inner direction of each of the protruding portions 43*a*, and is fitted with a return spring (compression coil spring) 49 with a play therebetween.

A plurality of protruding pieces 39*b* facing the respective protruding portions 43*a* are provided in a protruding manner on an outer peripheral surface of the pressure plate 39. The right end of each of the return springs 49 is in contact with pressure with the left side face of each of the protruding piece 39*b*, whereby the pressure plate 39 is always urged toward the right side, that is, in the direction departing from the rightmost fixed-side brake disc 38.

Figure 3:
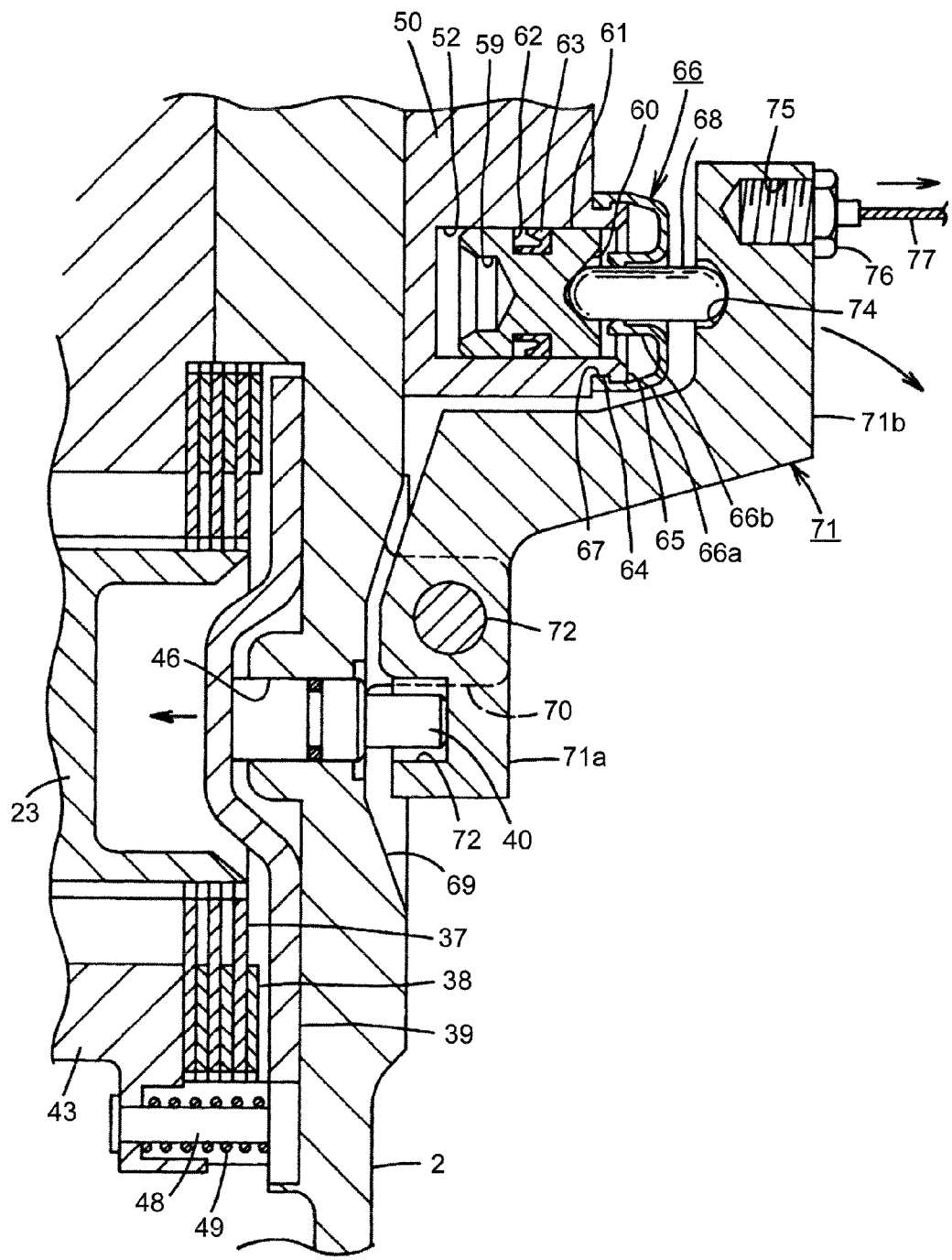
FIG. 3 is an enlarged transverse sectional plan view taken along the line III-III of FIG. 1.
Figure 4:
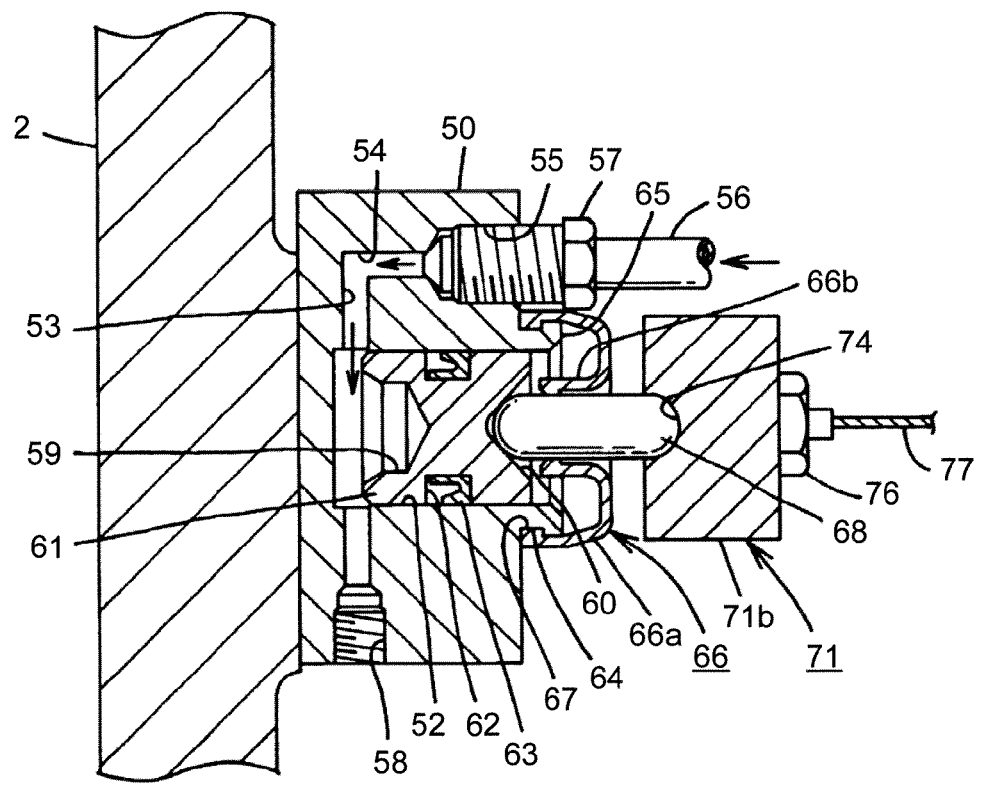
FIG. 4 is an enlarged longitudinal sectional front view taken along the line IV-IV of FIG. 1.

As illustrated in FIGS. 1, 3, and 4, a block plate 50 having a large thickness and a generally quadrilateral shape in the side view is firmly fixed by a plurality of screws 51 at a place on the right side face of the cover plate 2 at the slightly rear side of a portion corresponding to the above-described disc brake unit 36. The inside of the block plate 50 is provided with a closed-bottom cylinder chamber 52 opening toward the right side, a first oil passage 53 that is communicated with the vicinity of the bottom of the cylinder chamber 52 and running in parallel with the block plate 50, and a second oil passage 54 that is internally communicated with the first oil passage 53 and opens in the thickness direction on the right side face of the block plate 50.

The open end of the second oil passage 54 serves as an internally threaded hole 55 having a large diameter, which in turn is provided with a threaded nipple 57 screwed therein for connecting a hydraulic pipe 56. The other end of the hydraulic pipe 56 is connected to a brake hydraulic cylinder that houses a piston operating in conjunction with a brake pedal of the vehicle (all omitted from illustration), and when the brake pedal is depressed, pressure oil in the brake hydraulic cylinder is supplied through the hydraulic pipe 56 to the first and the second oil passages 53 and 54, and to the cylinder chamber 52. Reference numeral 58 represents a plug screw that hermetically plugs an open end of the first oil passage 53 formed with a drill.

The cylinder chamber 52 is slidably fitted with a hydraulic piston 61 that is formed, on the left side face and the right side face thereof, with a recessed oil chamber 59 and a conical depressed portion 60, respectively. An annular groove 62 formed on an outer peripheral surface of the hydraulic piston 61 is fitted with a seal member 63 that prevents the pressure oil from leaking out of the cylinder chamber 52.

The right side face of the portion having the cylinder chamber 52 in the block plate 50 is provided, in a protruding manner, with a tubular protruding portion 65 having an annular hooking groove 64 on an outer peripheral surface thereof so as to be communicated with the cylinder chamber 52. An annular engaging protruding portion 67 provided in a protruding manner on an inner surface of the left end of an outer cylindrical portion 66*a* of an annular pin-holding member 66 is elastically engaged with the hooking groove 64, whereby the tubular protruding portion 65 is immovably attached with the annular pin-holding member 66 in which a central portion of the outer cylindrical portion 66*a* opening at the left end thereof is integrally provided with an inner cylindrical portion 66*b* opening in both right and left directions. The inner cylindrical portion 66*b* is fitted with and holds a pin 68 that has spherical faces at both ends and is directed in the right-left direction. The pin 68 abuts on the spherical left end face thereof against the bottom surface of the depressed portion 60 on the right side face of the hydraulic piston 61, and thereby, is movable in a tilting manner relative to the hydraulic piston 61.

A depressed portion 69 having a dish-like section is formed at a portion on the right side face of the cover plate 2 corresponding to the disc brake unit 36. In the depressed portion 69, a portion facing the block plate 50 is provided in a protruding manner with a pair of upper and lower supporting pieces 70, 70 directed toward the right side. Between both of the supporting pieces 70, a forward arm portion 71*a* on the front side in the pressing arm 71 that is directed substantially in the fore-aft direction in the side view and that has a crank-like transverse sectional shape is pivotally mounted in a rotatable manner in the right-left direction by a spindle 72 directed substantially in the up-down direction (refer to FIGS. 1 and 3).

The left side face of the front end of the forward arm portion 71*a* has a long groove 73 directed in the right-left direction, and the right end face of the pressing rod 40 protruding from the cover plate 2 abuts against the bottom surface of the long groove 73.

A rearward arm portion 71*b* on the rear side of the pressing arm 71 faces the hydraulic piston 61 on the right side separated from the block plate 50, and the right end face of the pin 68 abuts against the bottom surface of a spherical depressed hole 74 formed on the left side face of the rearward arm portion 71*b*. Note that the depressed hole 74 has a larger size than the diameter of the pin 68, so that the pin 68 is movable in a tilting manner relative to the rearward arm portion 71*b*.

The rear end of the rearward arm portion 71*b* has an internally threaded hole 75 having a closed bottom and opening toward the right side, and a cable mounting screw 76 is screwed in the internally threaded hole 75. A cable 77 is connected to the cable mounting screw 76 at one end thereof while the other end thereof is connected to a parking brake operating lever (omitted from illustration).

In the transmission with a built-in brake of the embodiment described above, when the brake pedal is depressed, the pressure oil from the brake hydraulic cylinder is supplied through the hydraulic pipe 56 to the first and the second oil passages 53 and 54 provided in the block plate 50, and fed by pressure to the bottom portion of the cylinder chamber 52 and to the oil chamber 59 on the left end face of the hydraulic piston 61.

Then, the hydraulic piston 61 and the pin 68 that abuts at the left end thereof against the depressed portion 60 on the right end face of the hydraulic piston 61 are moved toward the right side of the cover plate 2, whereby as indicated by an arrow in FIG. 3, the pressing arm 71 rotates toward the right side around the spindle 72. In this case, the spherical left and right end faces on the pin 68 abut against the conical depressed portion 60 of the hydraulic piston 61 and the spherical depressed hole 74 in the rearward arm portion 71*b* of the pressing arm 71, respectively, and the pin 68 is movable in a tilting manner. Therefore, the hydraulic piston 61 and the pin 68 are free from any possibility of being subjected to bending load, and the pressing arm 71 can also rotate without resistance.

With this rotation, the forward arm portion 71a of the pressing arm 71 rotates leftward, and thus, the pressing rod 40 abutting against the left side face of the front end of the forward arm portion 71a and the pressure plate 39 abutting against the left end face of the pressing rod 40 are pressed leftward.

As a result, the rightmost fixed-side brake disc 38 facing an outer peripheral end portion of the pressure plate 39 is pressed leftward; whereby all of the brake discs 37 and 38 come in contact with each other with pressure; then, the drive shaft 23 integrally rotating with the drive gear 24, the planetary gear unit 18, and the output shaft 4 are restricted from rotating; and thus, a braking force is applied to the wheel 12.

When the parking brake operating lever is pulled at the time of, for example, parking the vehicle, the pressing arm 71 is rotated by the cable 77 connected to the lever. Therefore, the wheel 12 is prevented from rotating by the same effect as that described above. Although the rearward arm portion 71b departs from the right end of the pin 68 when the pressing arm 71 is rotated by pulling the parking brake operating lever, the pin 68 is held by the pin-holding member 66 and is thus free from any possibility of falling off the depressed portion 60 of the hydraulic piston 61.

As described above, in the transmission with a built-in brake of the embodiment described above, the wheel 12 can be given a braking force by rotating the single pressing arm 71 with the dual system including the pressure oil when the brake pedal is depressed and the cable 77 connected to the parking brake operating lever. Accordingly, the structure is simplified.

In addition, the hydraulic piston 61 operated by the pressure oil is housed in the cylinder chamber 52 inside the block plate 50 that is substantially integrated with the cover plate 2, and the pressing force of the hydraulic piston 61 is transmitted to the pressing arm 71 via the pin 68, and moreover, the hydraulic pipe 56 supplying the pressure oil to the cylinder chamber 52 is mounted on the stationary block plate 50. Therefore, the hydraulic pipe 56 is prevented from frequently moving together with the pressing arm 71 each time the braking is applied via the brake pedal, as conventionally occurs. Accordingly, the pressure oil is free from any possibility of leaking out due to, for example, occurrence of a crack in the hydraulic pipe 56, and durability of the hydraulic pipe 56 can be improved.

In the embodiment described above, the cover plate 2 serving as a sidewall of the transmission case 1 is attached on the right side face thereof with the separately provided block plate 50 by screws, and the hydraulic piston 61 is housed in the cylinder chamber 52 provided inside the block plate 50. However, the entire cover plate 2 or a part of the cover plate 2 near the pressure plate 39 may be thick-walled, and the hydraulic piston 61 may be housed in a cylinder chamber provided in the thick-walled cover plate. Such a configuration makes the block plate 50 unnecessary, and thus, the number of components and the number of assembly man-hours can be reduced.

Figure 5:
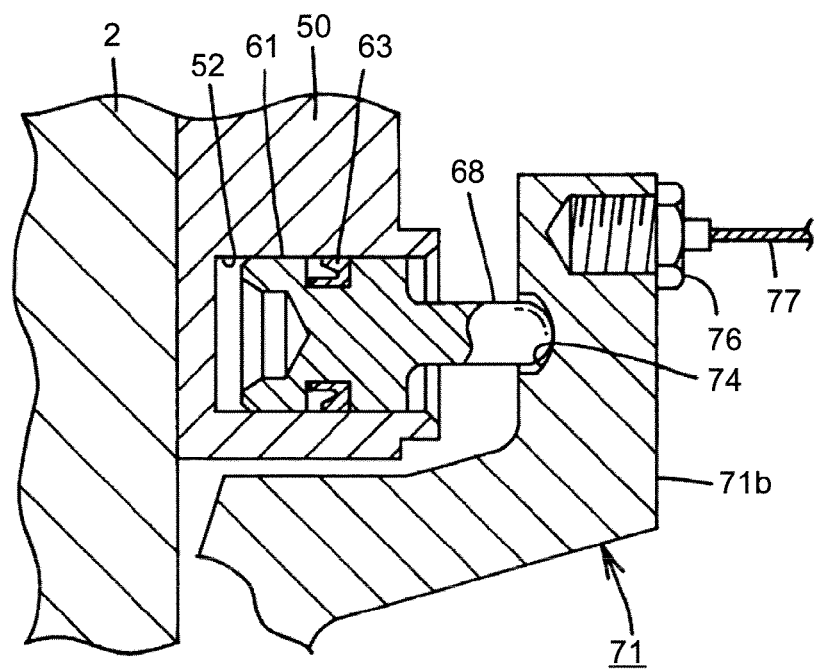
FIG. 5 is an enlarged sectional view of an essential part illustrating a variation in which a pin is integrally formed on a hydraulic piston.

Moreover, as illustrated in FIG. 5, the pin 68 may be provided in an integrally connected manner to the hydraulic piston 61. Such a configuration makes it unnecessary to separately produce the pin 68 and makes the pin-holding member 66 unnecessary, and thus, the number of components and cost are reduced.

Furthermore, in some cases, the pin 61 as described above is omitted, and an outside face of the hydraulic piston 61 formed in a longer size directly presses the rearward arm portion 71b of the pressing arm 71.

REFERENCE SIGNS LIST

1 TRANSMISSION CASE
2 COVER PLATE (SIDEWALL)
3 BOLTS
4 OUTPUT SHAFT
5 BEARING
6 WHEEL SHAFT
6a EXPANDED DIAMETER FLANGE
7 SPLINE
8 SMALL-DIAMETER SCREW SHAFT
9 WASHER
10 NUT
11 SEAL MEMBER
12 WHEEL
13 BOLTS
14 NUTS
15 SUN GEAR
16 PLANETARY GEARS
17 RING GEAR
17a INTERNAL TEETH
18 PLANETARY GEAR UNIT
19 BEARING
20 SPINDLE
21 CONNECTING PIECES
22 STEPPED HOLE
23 DRIVE SHAFT
24 DRIVE GEAR
24a CYLINDRICAL AXIS
25 SPLINE
26 DEPRESSED PORTION
27 ELECTRIC DRIVE UNIT
28 INPUT SHAFT
29 SPLINE
30a SUPPORT SHAFT
30b SUPPORT SHAFT
31 INPUT GEAR
32 STEPPED HOLE
33 BEARING
34 THROUGH-INSERTION HOLE
35 BEARING
36 DISC BRAKE UNIT
37 ROTATING-SIDE BRAKE DISCS
38 FIXED-SIDE BRAKE DISCS
39 PRESSURE PLATE
39a SWOLLEN PORTION
39b PROTRUDING PIECES
40 PRESSING ROD
41 CYLINDRICAL PORTION
42 SPLINE
43 DISC HOLDING PLATE
43a PROTRUDING PORTIONS
44 BOLTS
45 BEARING
46 AXIAL HOLE
47 DEPRESSED HOLES
48 GUIDE PINS
49 RETURN SPRING
50 BLOCK PLATE
51 SCREWS
52 CYLINDER CHAMBER
53 FIRST OIL PASSAGE
54 SECOND OIL PASSAGE
55 INTERNALLY THREADED HOLE

56 HYDRAULIC PIPE
57 THREADED NIPPLE
58 PLUG SCREW
59 OIL CHAMBER
60 DEPRESSED PORTION
61 HYDRAULIC PISTON
62 ANNULAR GROOVE
63 SEAL MEMBER
64 HOOKING GROOVE
65 ANNULAR PROTRUDING PORTION
66 PIN-HOLDING MEMBER
66a OUTER CYLINDRICAL PORTION
66b INNER CYLINDRICAL PORTION
67 ENGAGING PROTRUDING PORTION
68 PIN
69 DEPRESSED PORTION
70 SUPPORTING PIECES
71 PRESSING ARM
71a FORWARD ARM PORTION
71b REARWARD ARM PORTION
72 SPINDLE
73 LONG GROOVE
74 DEPRESSED HOLE
75 INTERNALLY THREADED HOLE
76 CABLE MOUNTING SCREW
77 CABLE

The invention claimed is:

1. A vehicle transmission with a built-in brake, comprising:
a transmission case having a sidewall;
a disc brake unit housed in the transmission case, the disc brake unit having a pressing rod penetrating the sidewall and a pressure plate; and
a pressing arm that is pivotally provided in a rotatable manner on the sidewall and that is rotated by a dual system including a parking brake cable and a hydraulic piston operated by operation of a brake pedal, the pressing arm having one end for pressing an outer end of the pressing rod,
wherein the hydraulic piston is housed in a cylinder chamber that is open toward the pressing arm provided on the sidewall so as to be capable of abutting against the other end of the pressing arm and rotating the pressing arm, and a hydraulic pipe that supplies pressure oil to the cylinder chamber is connected to the sidewall.

2. The vehicle transmission with a built-in brake according to claim 1, wherein a pin is interposed between the pressing arm and the hydraulic piston so as to be movable in a tilting manner relative to the hydraulic piston.

3. The vehicle transmission with a built-in brake according to claim 2, wherein a conical depressed portion is provided at an end face of the hydraulic piston facing the pressing arm, and the pin having a spherical end face on the hydraulic piston side is abutted so as to be movable in a tilting manner against a bottom surface of the depressed portion.

4. The vehicle transmission with a built-in brake according to claim 1, wherein a pin having a spherical end face on the pressing arm side is integrally provided in a protruding manner on an outer face of the hydraulic piston, and the spherical end face is abutted against the other end of the pressing arm.

5. The vehicle transmission with a built-in brake according to claim 1, wherein the hydraulic pipe is fixed relative to the sidewall.

* * * * *